(12) United States Patent
Mughal et al.

(10) Patent No.: US 9,653,001 B2
(45) Date of Patent: May 16, 2017

(54) VEHICLE DRIVING AIDS

(71) Applicant: GM GLOBAL TECHNOLOGY OPERATIONS LLC, Detroit, MI (US)

(72) Inventors: Akkas A. Mughal, Port Elgin (CA); Roddi L. Macinnes, Thornhill (CA); Neeraj R. Gautama, Whitby (CA); Jarvis Chau, Markham (CA); Shaun S. Marshall, Port Berry (CA); Cem U. Saraydar, Birmingham, MI (US); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 14/684,275

(22) Filed: Apr. 10, 2015

(65) Prior Publication Data

US 2016/0298971 A1   Oct. 13, 2016

(51) Int. Cl.
*G09B 19/16* (2006.01)
*B60W 50/14* (2012.01)
*G09B 9/042* (2006.01)

(52) U.S. Cl.
CPC ........... *G09B 19/167* (2013.01); *B60W 50/14* (2013.01); *G09B 9/042* (2013.01)

(58) Field of Classification Search
CPC ..... B60R 1/00; B60R 2300/105; B60R 1/062; B60R 1/12; B60R 2001/1215; B60R 2300/102; B60R 2300/103; B60R 2300/20; B60R 2300/205; B60R 2300/207; B60R 2300/303; B60R 2300/305;

(Continued)

(56) References Cited

U.S. PATENT DOCUMENTS 5,366,376 A * 11/1994 Copperman .......... A63F 13/005
                                                       273/148 B
8,174,375 B2   5/2012 Fong et al.
(Continued)

OTHER PUBLICATIONS http://www.youtube.com/watch?v=2GuWUy9wxVU; Accessed Mar. 13, 2015.

*Primary Examiner* — Jelani Smith
(74) *Attorney, Agent, or Firm* — Harness, Dickey & Pierce, P.L.C.

(57) ABSTRACT

Automotive vehicle driving aid includes a computer program with a training module having instructions for providing audio/visual feedback during training route (TR) execution, and dynamically adjusting the TR to enable practice of a maneuver and avoidance of another maneuver. The program includes a driver aid module, practice module and/or test module. Driver aid module includes instructions for providing feedback during driver aid route (DAR) execution, dynamically adjusting the DAR to enable practice of a maneuver and avoidance of another maneuver, and providing a notification upon recognizing an object outside a vehicle during DAR execution. Practice module includes instructions for receiving a learning preference input and generating a practice route including the learning preference. Test module includes instructions for disabling feedback systems, assessing a driving maneuver during a test route (TR), and upon completion of TR, providing a driving report. Audio system provides audio feedback, and electronic display provides visual feedback.

18 Claims, 5 Drawing Sheets

(58) Field of Classification Search
CPC .......... B60R 2300/306; B60R 2300/70; B60R 2300/806; B60W 50/167; G09B 9/042
See application file for complete search history.

(56) References Cited

U.S. PATENT DOCUMENTS

| | | | | |
|---|---|---|---|---|
| 9,373,203 | B1* | 6/2016 | Fields | G07C 5/12 |
| 2012/0191343 | A1* | 7/2012 | Haleem | G01C 21/3697 |
| | | | | 701/431 |
| 2014/0121897 | A1* | 5/2014 | Felkins | B60W 50/14 |
| | | | | 701/36 |
| 2015/0310287 | A1* | 10/2015 | Tseng | B60K 35/00 |
| | | | | 382/104 |

* cited by examiner

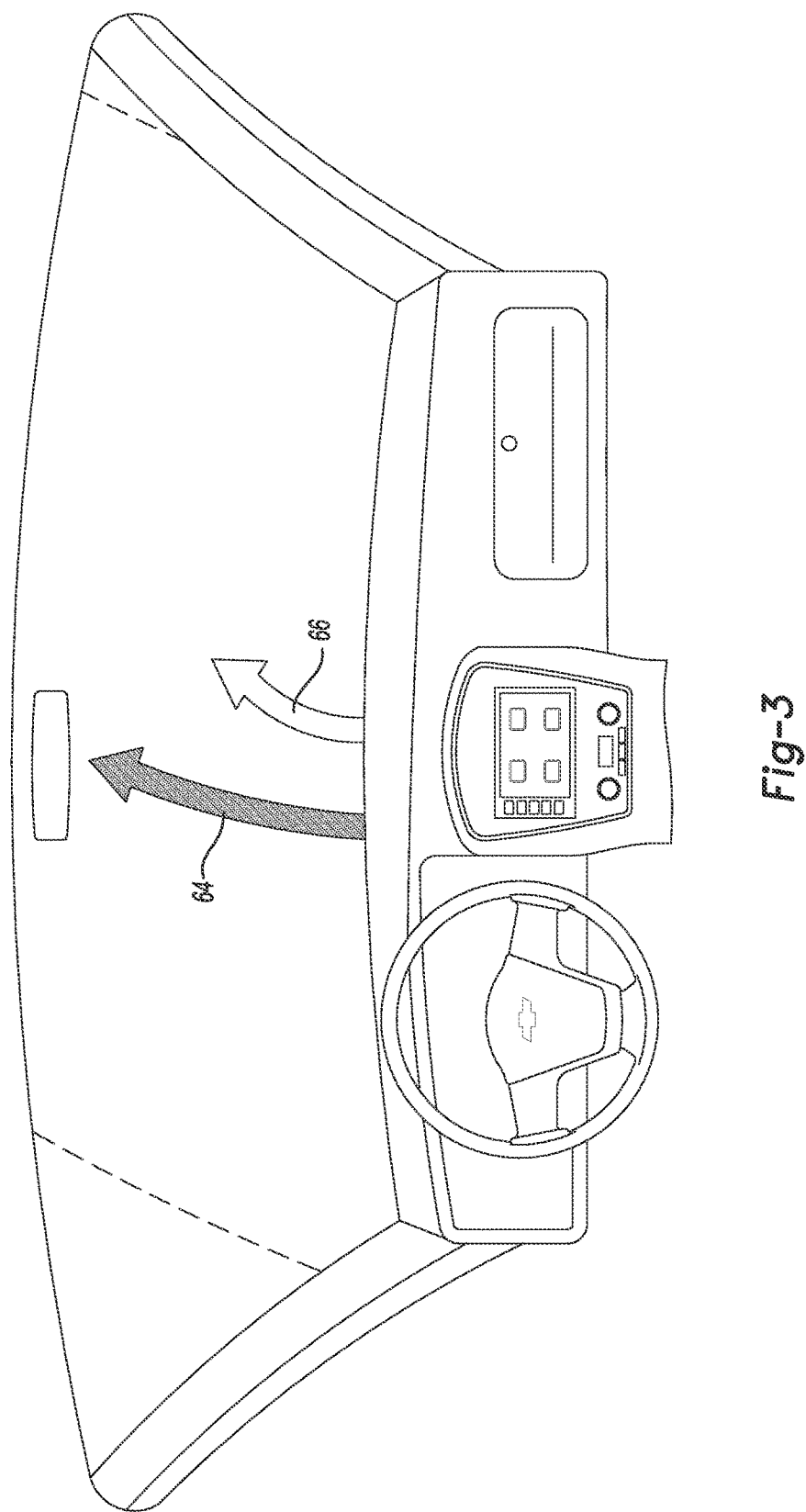

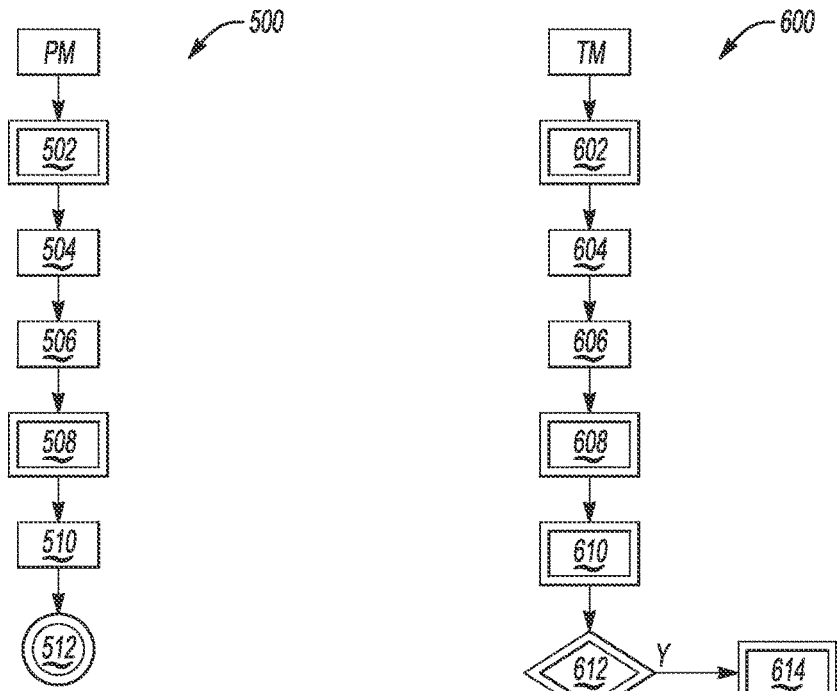
Fig-5
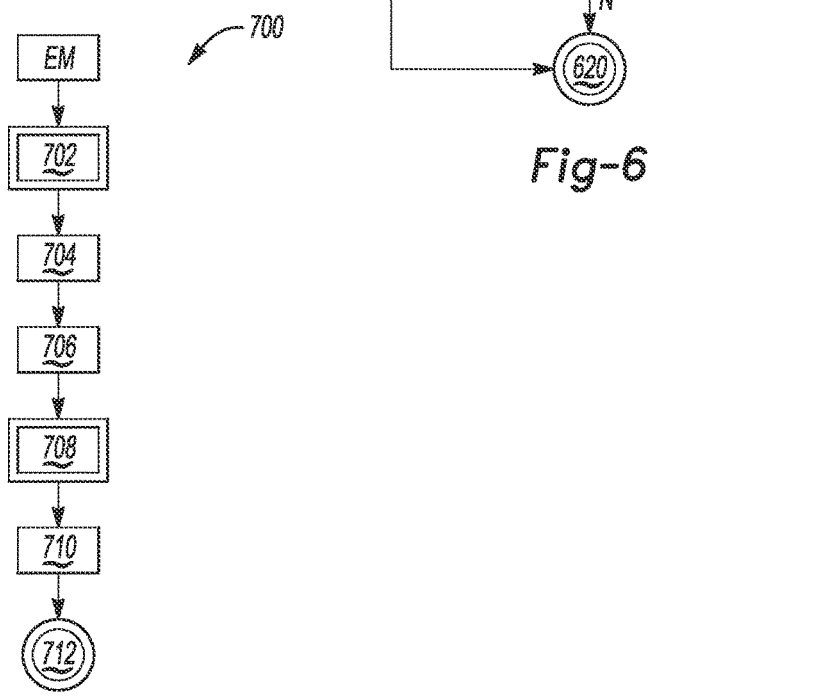
Fig-6
Fig-7

VEHICLE DRIVING AIDS

TECHNICAL FIELD

The present disclosure relates generally to vehicle driving aids.

BACKGROUND

Vehicles are equipped with several components that assist the driver in operating the vehicle. As one example, vehicles include rear and side view mirrors to assist the driver in seeing what is behind and next to his/her vehicle. Some vehicles are equipped with an in-vehicle communications platform (e.g., telematics unit and/or infotainment units) or other in-vehicle controller that enables several services/features. For example, the in-vehicle communications platform may enable navigation instruction transmission to provide the driver with a route to his/her destination. For example, the in-vehicle communications platform may be operatively connected to a rear-view camera and a display, which together provide the driver with a visual of the environment behind his vehicle as he/she reverses the vehicle.

SUMMARY

Examples of automotive vehicle driving aids include a driving aid computer program and a blind spot driving aid computer program. Each of these programs is embedded on respective non-transitory, tangible computer readable medium. One example of the automotive vehicle driving aid includes the driving aid computer program, which includes a training module having instructions for providing audio and visual feedback during training route (TR) execution, and dynamically adjusting the TR to enable practice of a maneuver and avoidance of another maneuver. The program includes a driver aid module, a practice module and/or a test module. The driver aid module includes instructions for providing feedback during driver aid route (DAR) execution, dynamically adjusting the DAR to enable practice of a maneuver and avoidance of another maneuver, and providing a notification upon recognizing an object outside a vehicle during DAR execution. The practice module includes instructions for receiving a learning preference input and generating a practice route including the learning preference. The test module includes instructions for disabling feedback systems, assessing a driving maneuver during a test route (TR), and upon completion of TR, providing a driving report. The driving aid also includes an audio system of the automotive vehicle for providing the audio feedback, and an electronic display of the automotive vehicle for providing the visual feedback.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 semi-schematically depicts a vehicle interior where an ideal driving line and a then-current driving line are displayed to a vehicle occupant on an augmented reality heads-up display;

FIG. 5 is a flow diagram illustrating steps executed during operation of a practice mode of the driving aid computer program;

FIG. 6 is a flow diagram illustrating steps executed during operation of a test mode of the driving aid computer program;

FIG. 7 is a flow diagram illustrating steps executed during operation of an exclusions mode of the driving aid computer program.

DETAILED DESCRIPTION

Example(s) of the automotive vehicle driving aids disclosed herein provide a driver with real-time feedback and/or reminders as he/she executes a driving route. One example of the vehicle driving aid is a driving aid computer program that includes multiple modules and associated modes. The driver is able to select a particular mode to operate in, during which he/she will be provided with mode-specific routing options. In addition to the mode-specific routing options, the driver may also be provided with audio and visual feedback, notification(s), and/or a driving report. Another example of the vehicle driving aid is a blind spot driving aid computer program. With this program, a driver may be reminder to check his/her blind spot before changing lanes.

It is to be understood that, as used herein, the term "user" includes a vehicle driver, which may be the vehicle owner or another authorized driver of the vehicle.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
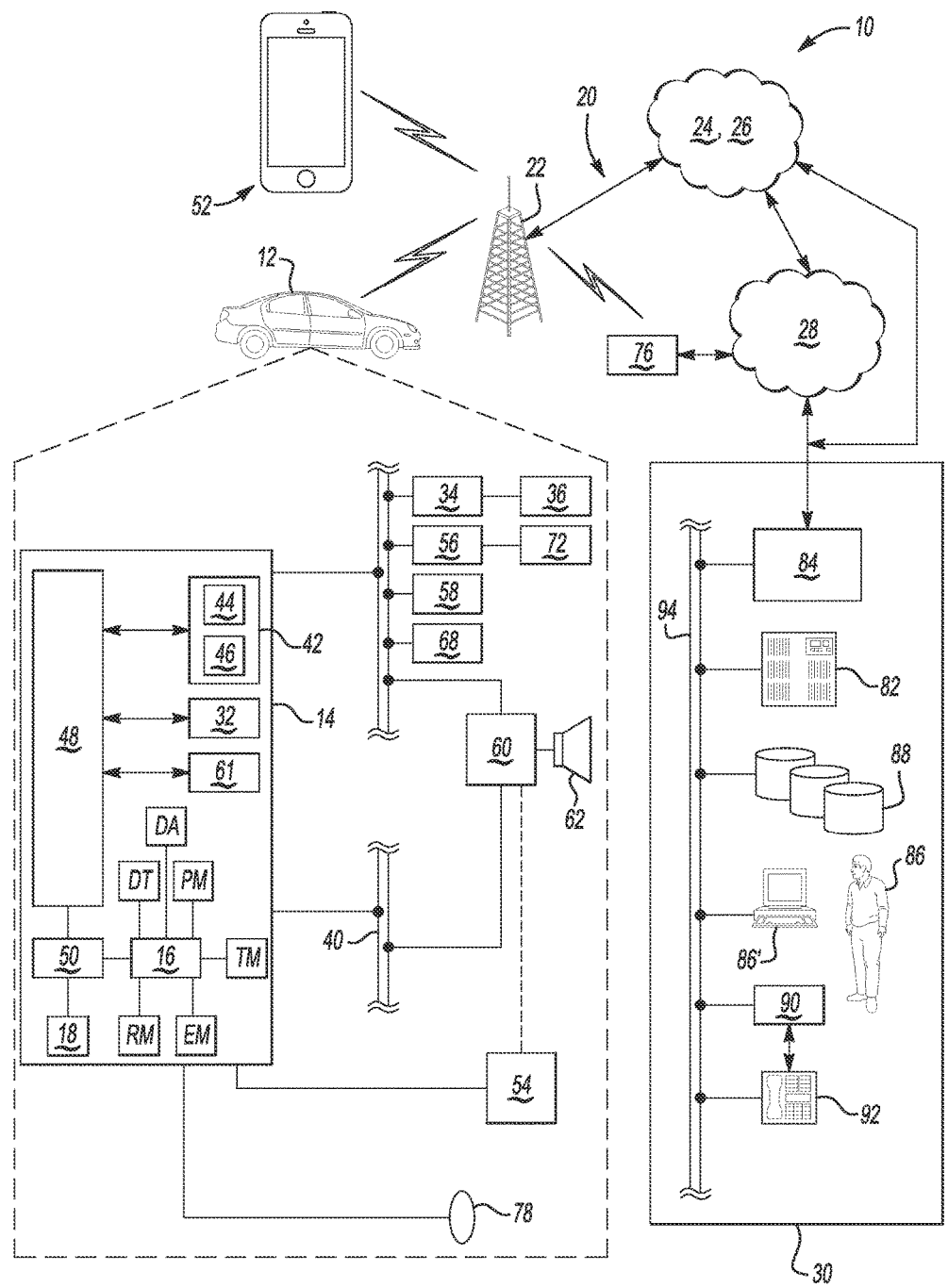
FIG. 1 is an example of a system including a vehicle and examples of the vehicle driving aids disclosed herein.

Referring now to FIG. 1, an example of a system 10 is depicted. While several components are shown, the system 10 at least includes the vehicle 12, the vehicle communications platform (VCP) 14, and an example of the vehicle driving aid disclosed herein (e.g., driving aid computer program 16 and/or blind spot driving aid computer program 18).

The vehicle 12 may be a car, motorcycle, truck, or recreational vehicle (RV) that is equipped with suitable hardware and computer readable instructions/code that enable it to communicate (e.g., transmit and/or receive voice and data communications) over a carrier/communication system 20.

In an example, the carrier/communication system 20 is a two-way radio frequency (RF) communication system. The carrier/communication system 20 may include one or more cell towers 22 or satellites (not shown). It is to be understood that the carrier/communication system 20 may also include one or more base stations and/or mobile switching centers (MSCs) 24 (e.g., for a 2G/3G network), one or more evolved Node Bs (eNodeB) and evolved packet cores (EPC) 26 (for a 4G (LTE) network), and/or one or more land networks 28. The carrier/communication system 20 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 20 may be GSM (global system for mobile telecommunications), CDMA2000, UMTS (universal mobile telecommunications system), LTE (long-term evolution), or some other available architecture.

An Internet connection may also be utilized for the transmission of the message(s) (e.g., transmission of the driving report to a social media website). The transmission of the messages may be made using the carrier/communication system 20, either through the vehicle's Internet connection (e.g., when the vehicle 12 is equipped with a 4G long-term evolution, LTE, or other suitable Internet connection) or through a connected mobile device's cellular and Internet connection. When the vehicle 12 utilizes the mobile device's cellular and Internet connection, it is to be understood that vehicle 12 is connected to the cellular and Internet connection through a short range wireless communication link with the mobile device (which, in these instances, is present in the vehicle 12).

As shown in FIG. 1, the vehicle 12 includes the VCP 14. In an example, the VCP 14 is an on-board vehicle dedicated communications and entertainment device. In another example (not shown), the VCP 14 is an on-board vehicle dedicated entertainment device that is in operative communication with a separate on-board vehicle dedicated communications device (e.g., a telematics unit). Whether integrated into a single unit (e.g., VCP 14) or included as separate units, the on-board vehicle dedicated communications and entertainment device(s) include hardware components that are capable of running computer readable instructions/code, which are embodied on non-transitory, tangible computer readable media.

The VCP 14 may provide a variety of services, both individually and through its communication with a service center 30 (e.g., which may be a facility that is owned and operated by a VCP service provider). Several examples of these services include, but are not limited to: turn-by-turn directions and other navigation-related services provided in conjunction with a location detection module 32; airbag deployment notification and other emergency or roadside assistance-related services provided in connection with various sensor interface modules 34 and sensors 36 located throughout the vehicle 12; and infotainment-related services where music, Web pages, movies, television programs, videogames and/or other content is downloaded by the VCP 14 via a vehicle bus system 38 and an audio bus system 40.

The listed services are by no means an exhaustive list of all the capabilities of the VCP 14, but are an illustration of some of the services that the VCP 14 is capable of offering.

As noted above, the VCP 14 may be used for vehicle communications. Some vehicle communications utilize radio or satellite transmissions to establish a voice channel with the carrier/communication system 20 such that both voice and data transmissions may be sent and received over the voice channel. In some instances, vehicle communications are enabled through the VCP 14 via a communications module 42, which includes a cellular chipset/component 44 for voice communications and a data transmission system 46 for data transmission. In an example, the data transmission system 46 may include a packet builder, which is programmed to make decisions about what packet to send (e.g., bandwidth, data to include, etc.) and to actually build a packet data message. In another example, the data transmission system 48 may include a wireless modem, which applies some type of encoding or modulation to convert the digital data so that it can communicate through a vocoder or speech codec incorporated in the cellular chipset/component 44. It is to be understood that any suitable encoding or modulation technique that provides an acceptable data rate and bit error may be used with the examples disclosed herein. While examples have been provided, it is to be understood that any suitable data transmission system 46 may be used.

The cellular chipset/component 44 of the VCP 14 may be an analog, digital, dual-mode, dual-band, multi-mode and/or multi-band wireless transceiver. The cellular chipset-component 44 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

The VCP 14 may also be configured for short range wireless communication technologies, such as BLUETOOTH® and various classes thereof, dedicated short-range communications (DSRC), or WI-FI™ and various classes thereof. In these instances, the cellular chipset/component 46 may operate in conjunction with a short range wireless communication unit (not shown). As described above, the vehicle 12 may utilize the mobile device's cellular and Internet connection by connecting to the mobile device through short range wireless communications.

The VCP 14 generally includes an electronic processing device 48 operatively coupled to one or more types of electronic memory 50. In an example, the electronic processing device 48 is a micro-processor. In other examples, the electronic processing device 48 may be a micro controller, a controller, a host processor, and/or a vehicle communications processor. In another example, electronic processing device 48 may be an application specific integrated circuit (ASIC).

The electronic memory 50 of the VCP 14 may be an encrypted memory that is configured to store i) computer readable instructions/code to be executed by the processor 48, ii) a data table containing learning or exclusion preferences, iii) data associated with the various systems of the vehicle 12 (i.e., vehicle data), and the like. In an example, the electronic memory 50 stores the computer program(s)/application(s) 16 and/or 18. The electronic memory 50 may also store a unique identifying code that can be used to establish a short range wireless communication link with the mobile device.

In some examples, the computer program(s)/application(s) 16 and/or 18 may be downloaded (e.g., from an online application store or marketplace) and stored on the electronic memory 50. In other examples, the computer program(s)/applications 16 and/or 18 may be installed and stored on the electronic memory 50 during production of the vehicle 12.

The driving aid computer program 16 includes a user interface that enables the user to input, for example, his/her mode selection, preference(s) for particular routes, instructions for transmitting the driving report to an external device (e.g., a communications and processing device 52, discussed further hereinbelow), a social media website, or other external entity, etc. The blind spot driving aid computer program 18 includes a user interface that enables the user to turn the blind spot driving aid on or off during a driving event.

Either of the computer program(s)/application(s) 16 and/or 18 may be opened using an in-vehicle display 54. The display 54 may be operatively directly connected to or in communication with the VCP 14. Examples of the display 54 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the vehicle 12 includes both a full-color touch screen display as well as a heads-up display.

The computer program(s)/application(s) 16 and/or 18 may or may not require the user to log in. Once opened, the programs/applications 16 and 18 enable the user to utilize various functions of the respective programs/applications 16 and 18. The driving aid computer program 16 and its various modules and modes will be described herein in references to FIGS. 2-7, and the blind spot driving aid computer program 18 will be described herein in reference to FIG. 8. In these Figures, the single line boxes identify steps that involve user input and/or action, and the double line boxes identify steps that are performed by the program 16 or 18. It is to be understood that throughout the discussion of the other Figures, various components of the system 10 of FIG. 1 may also be referenced and/or described.

Once the driving aid computer program 16 is opened, the user interface of the program 16 enables the user to select one of the various modes. The various modes include a driver training mode (also referred to herein as a training mode) and any of a driver aid mode, a practice mode, a test mode, or combinations thereof. In some examples, the driving aid computer program 16 also includes an exclusions mode. Each of the modes is associated with a module (e.g., driver training module or training module DT, driver aid module DA, practice module PM, test module TM, and exclusions module EM) that includes computer readable instructions, executable by the processor 48, for performing various steps and functions of the mode.

In an example, a data table is presented to the user on the display 54, and the user selects the mode from the data table. In one example, the user may input his/her selected mode using the display touch screen or by speaking his/her selection into a microphone 78 (e.g., when the program 16 is capable of speech recognition). The selection of one of the modes will initiate the processor 48 to execute the instructions of the module associated with the selected mode.

Figure 2:
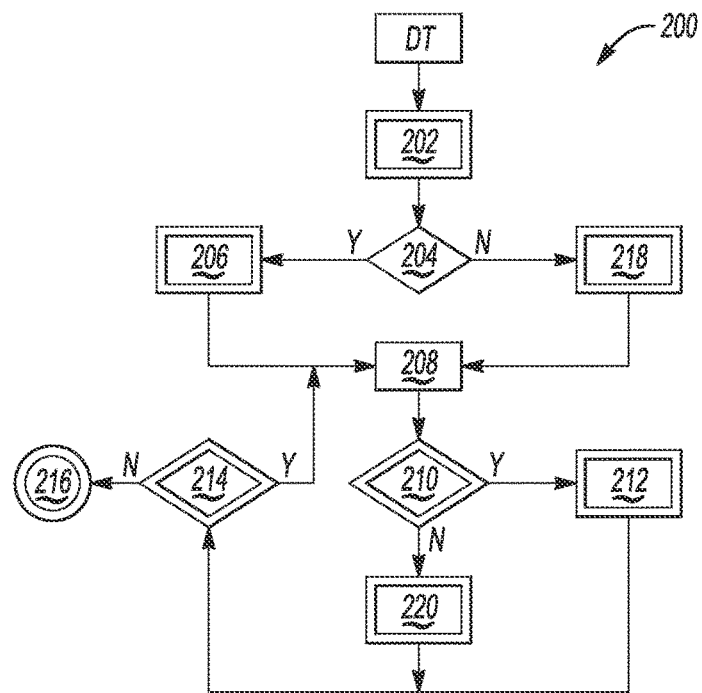
FIG. 2 is a flow diagram illustrating steps executed during operation of a driver training mode of a driving aid computer program.

The driver training module DT and mode will be described in reference to FIGS. 1 and 2. Reference numeral 200 in FIG. 2 generally identifies steps that are executed during the operation of the driver training mode. The box labeled DT indicates that the user has input his/her selection to initiate the training module DT and mode, and the program 16 recognizes this selection.

In response to the user selection of the training mode, the training module DT initiates a feedback system, as shown at reference numeral 202. The feedback system may include vehicle sensor(s) 36, a gaze detection unit 56, and exterior camera(s) 58, as well as the display 54 and an audio component 60.

The audio component 60 is operatively connected to the vehicle bus 38 and the audio bus 40. The audio component 60 receives analog information, rendering it as sound, via the audio bus 40, and receives digital information, rendering it as sound, via the vehicle bus 38. The audio component 60 provides AM and FM radio, satellite radio, CD, DVD, multimedia and other like functionality independent of the VCP 14. In the examples disclosed herein, the audio component 60 is capable of delivering audible messages or notifications to the user that provide real-time feedback with regard to executed and evaluated driving maneuvers. The audio component 60 may contain a speaker system 62, or may utilize other vehicle speakers (not shown) via arbitration on vehicle bus 38 and/or audio bus 40.

The driver training module DT then enables the user to enter his/her destination via the display 54, as depicted at reference numeral 204. When the user enters his/her destination, the driver training module DT is configured to prompt the user for information about maneuver(s) to include in the route as well as maneuver(s) to avoid. For example, the program 16 may provide the user with a list of driving maneuvers (e.g., roundabouts, one-way streets, turn-arounds, left turns, etc.) and the user can select one or more that he/she would like included in the route (if possible depending upon the starting location, the destination location, construction, etc.) and one or more that he/she would like to avoid in the route (if possible, depending upon the starting location, the destination location, construction, etc.). Maneuvers may be included that the user wishes to practice, while other maneuvers may be excluded that the user wishes to avoid. Upon receiving this additional information, the program 16 accesses an in-vehicle navigation unit 61 in order to generate initial step(s) of a training route to the input destination (reference numeral 206).

The training module DT includes instructions to dynamically adjust, in conjunction with the in-vehicle navigation unit 61, the training route as the user travels to the destination. Audible and/or visual navigation prompts are played or displayed for the user to aid him/her in traversing the dynamically generated/adjusted route. The dynamic adjustments to the training route may accommodate any vehicle 12 variations from the training route navigation prompt(s) provided to the user. For example, if the next navigation prompt instructs the user to go straight and the user turns right, the program 16 can dynamically update the route to accommodate this variation and keep the vehicle 12 heading toward the destination. Additionally, dynamic adjustments in the training route may be made to include more of the particular maneuvers and/or to avoid more of the particular maneuvers previously identified by the user. Through the in-vehicle navigation unit 61 and the location detection module 32, the program 16 is able to continuously monitor the vehicle 12 location with respect to the destination location, and to provide navigation prompts that will get the user to the destination location while also enabling the user to practice certain maneuvers while avoiding other maneuvers.

In response to the user entering the destination, the driver training module DT also enables the heads-up display and generates ideal and then-current driving lines for display on the heads-up display (one example of display 54). These lines are examples of the real-time visual feedback that is available to the user during the training mode. Examples of the ideal driving line 64 and the then-current driving line 66 are shown in FIG. 3. The then-current driving line 66 identifies, for the user, the line the vehicle 12 is then-currently traveling on. The ideal driving line 64 identifies, for the user, the line the vehicle 12 should be traveling on. The driving lines 64, 66 are essentially computer-generated sensory inputs.

To generate and display these lines 64, 66, the program 16 uses images from the external camera(s) 58 as well as data from the gaze detection unit 56. To generate the lines 64, 66, the program 16 receives images from the external camera(s) 58, and uses these images to determine the then-current positioning of the vehicle 12 with respect to the road (e.g., lane) and, if necessary, a more ideal position of the vehicle 12 with respect to the road (e.g., lane). Sensor 36 data (e.g., from lane detection sensors, from vehicle heading sensors, etc.) and/or driver input data may also be used by the program 16 to generate the then-current driving line 66. The then-current driving line is the predicted path of the vehicle 12 based upon the driver input, vehicle sensor data, and/or the exterior camera 58 data.

The ideal driving line 64 may be optimized for a number of objectives. For example, in racing, the ideal driving line 64 may minimize time to travel from one location to another while maintaining stability of the vehicle 12. The optimization includes the accelerating power, braking power, speed of the vehicle 12, 3-dimensional acceleration/deceleration, load transfer, suspension characteristics, location of the center-of-gravity of the vehicle 12 relative to the wheels, tire status (temperature, wear, pressure), road condition (smooth, rough, wet/dry, clean, oily), road angles (bank angle, grade angle), and marked driving lanes. The ideal driving line 64 for a vehicle 12 in a racing situation may have the vehicle path operating to turn with lateral acceleration such that the vehicle 12 is near the limits of adhesion of the tires. In a racing situation, the ideal driving line 64 may avoid sudden changes in the path that could cause the tires to slide and the vehicle 12 to lose lateral stability.

In a passenger vehicle driving situation, the ideal driving line 64 may be optimized for driver expectations/preferences. For example, one driver may prefer a sporty experience, with stronger lateral acceleration. Another driver may prefer a more luxurious experience with low sensations of jerk (time derivative of acceleration). The ideal driving line 64 may enable the vehicle to remain on a stable path, which maintains both longitudinal and lateral traction. The ideal driving line 64 may help to avoid oversteer and understeer at the current, projected, or possible speed along the ideal driving line 64.

In an example, the driving lines 64, 66 may be displayed using augmented reality, where a physical real world element (e.g., the road) is augmented using overlays, i.e., the driving lines 64, 66. The augmented driving lines 64, 66 may be displayed on and/or adjacent to the real world element (in this case, the road), and may be produced using a set of spatial displays. In an example, the augmented driving lines 64, 66 may be realized using digital light projectors 68 to form two-dimensional/three-dimensional imagery onto the real world element. The digital light projectors 68 are connected to the vehicle bus 38, and are thus in operative and selective communication with the VCP 14 and its processor 48. Further, the digital light projectors 68 may be positioned inside the vehicle interior so that the projectors 68 can produce the augmented driving lines 64, 66 through any window that is within the field of view of the vehicle driver, such as the windshield of the vehicle 12.

In an example, the processor 48 sends a two-dimensional rendering of the driving lines 64, 66 to be displayed from a preset reference location determined on an xyz coordinate frame of reference. To present the augmented driving lines 64, 66 on three-dimensional reality, via the processor 48, the head positioning and the eye positioning (i.e., gaze) of the vehicle driver and the concavity of the vehicle windshield are taken into account to properly adjust the two-dimensional rendering of the driving lines 64, 66. The adjusted two-dimensional rendering of the driving lines 64, 66 is then used to augment the three-dimensional reality as seen by the vehicle driver through the windshield of the vehicle 12.

The head and eye positioning of the vehicle driver may be obtained, for example, by tracking the vehicle driver's head and/or eyes while driving, and then updating the driving lines 64, 66 in real-time based on the tracking. This method may reliably determine the positioning of the vehicle driver in real-time since the driver may lean, shift, or otherwise move in his/her seat while driving, and thus the driver's viewing angle (based on his/her head and/or eye positioning) may constantly change.

Figure 8:
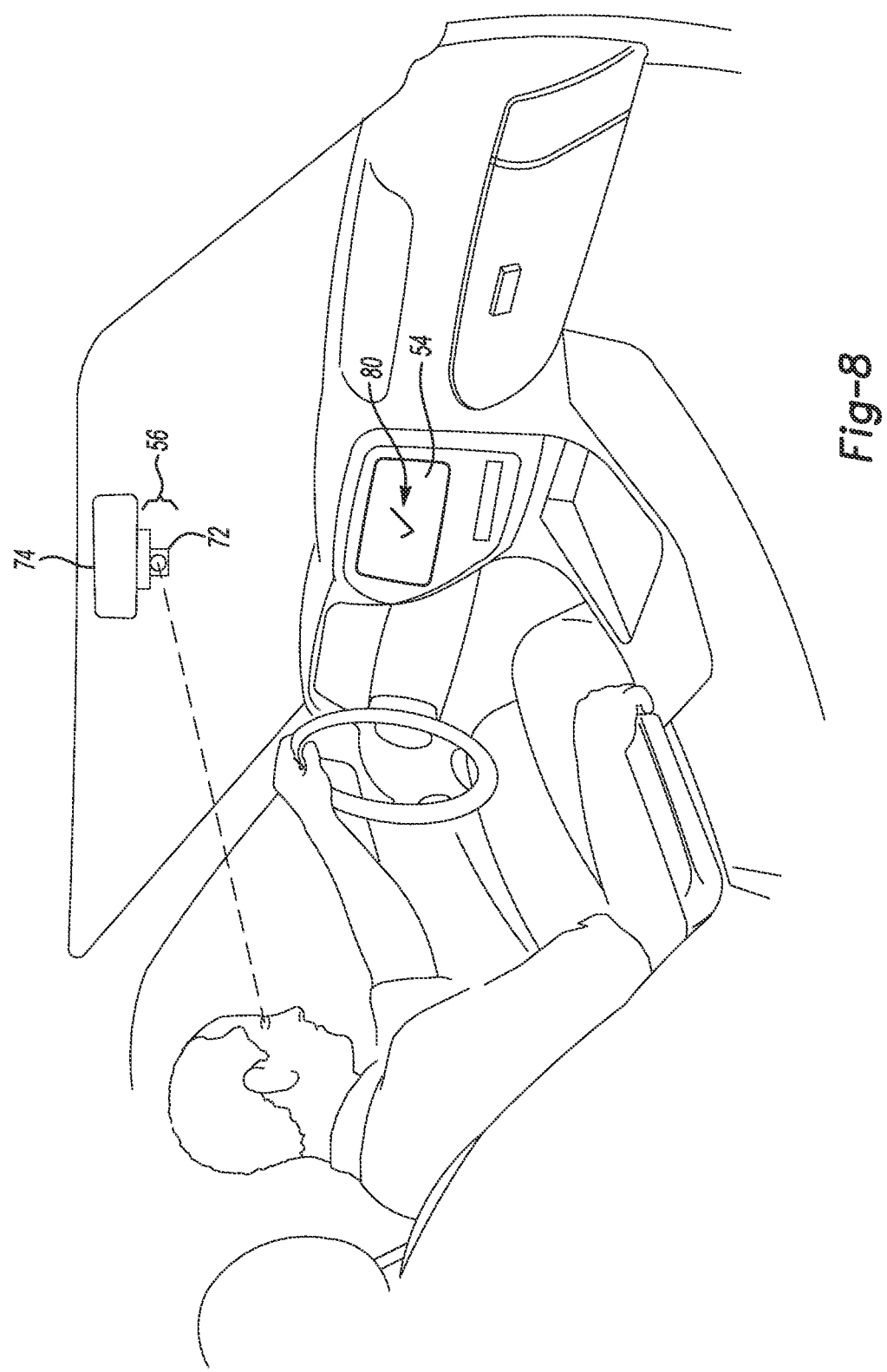
FIG. 8 semi-schematically depicts an example of a vehicle interior and a check blind spot reminder from a blind spot driving aid computer program.

In an example, the vehicle driver's eyes and/or head may be tracked utilizing the gaze detection unit 56, which is operatively disposed inside the vehicle interior (see, e.g., FIG. 8). In an example, the gaze detection unit 56 is an eye-tracking device or a head-tracking device that is configured to monitor an eye or head position of the vehicle driver while the vehicle 12 is in operation. For instance, the gaze detection unit 56 may be used to measure the driver's eye position (e.g., the point of gaze) and the movement of the driver's eyes (e.g., the motion of the eyes relative to the driver's head). Eye and/or head tracking may be accomplished by utilizing a facial imaging camera 72 (shown in FIG. 8), which may be placed inside the vehicle interior in any position that is in front of (either directly or peripherally) the vehicle driver. Example positions for the facial imaging camera 72 include on the rearview mirror 74 (as shown in FIG. 8), on the dashboard, on the mounting stem of the steering wheel, or the like. This camera 72 is configured to take images or video of the vehicle driver's face while driving, and the gaze detection unit 56 is further configured to extract the driver's eye and/or head position from the images/video. In another example, the movement of the driver's eyes is determined by light (such as infrared light) reflected from the cornea of the eye, which is sensed by a suitable electronic device (which can be part of the gaze detection unit 56) or an optical sensor (not shown). The information pertaining to the eye motion may then be utilized (e.g., by the processor 48 running the program 16) to determine the rotation of the driver's eyes and/or head based on changes in the reflected light.

The processor 48 executes the instructions of the program 16 which directs the gaze detection unit 56 to monitor the eye and/or head position of the vehicle driver while he/she is driving. Upon determining that the driver's eye and/or head position has changed, the gaze detection unit 56, via the processor 48, is configured to determine the direction at which the driver's eyes are now focused or the direction in which the driver's head is pointed. It is to be understood that the gaze detection unit 56 continues to monitor the eye and/or head position of the driver's eyes so that the gaze detection unit 56 can determine when the driver's eyes are positioned in a particular direction to determine the driver's viewing angle. When this occurs, the gaze detection unit 56 is further configured to send another signal to, for example, the processor 48, running the program 16, with information reflecting the driver's face angle based on the positioning of his/her eyes.

In another example, the gaze detection unit 56 may be a facial imaging device. This device also uses an imaging or video camera (such as the camera 72) to take images/video of the driver's face while he/she is operating the vehicle 12. The processor 48 uses the images/video to determine that the driver's then-current line-of-sight based, at least in part, on the facial position of the driver. The facial position may be determined, for example, by detecting the angle at which the driver's head is positioned in vertical and horizontal directions.

Another way of determining the vehicle driver's face angle is to use a profile key, where such key is associated with a particular user. The key may be stored in the user profile, and may include physical information of the user, such as the user's height, weight, age, etc. The eye and/or head position of the user may be determined from this information, as well as other vehicle interior information (such as seat weight and seat position) to obtain an xyz reference location of the user.

As the driver executes the training route, the driving lines 64, 66 may be used to provide the driver with real-time visual feedback.

In the various modes, the program 16 may also be programmed to use the ideal driving line 64 to provide the user with a real-time indication (e.g., via a color change, a remaining distance alert that is displayed on the ideal driving line 64, etc.) that the lane he/she is driving in is about to end. The color gradient (e.g., green, yellow, red) of the lines 64, 66 may be adjusted to indicate vehicle 12 braking or acceleration.

Referring back to FIG. 2, when prompted for the route destination (at reference numeral 204), the user may choose not to input the destination. In these instances, the driver training module DT is configured to bypass prompting the user for information about maneuver(s) to include in the route as well as maneuver(s) to avoid, as well as to bypass generating the initial step(s) of the training route. These bypass steps are shown at reference numeral 218 in FIG. 2.

Whether the destination is entered or not, as the vehicle 12 begins to travel, the driver training module DT monitors for the execution of a driving maneuver. The driving maneuvers to be monitored may be default settings, or may be programmed by the user. Example maneuvers include those previously mentioned, such as turns, roundabouts, turn-arounds, etc., as well as any other driving maneuver (e.g., reversing, changing lanes, etc.). The driver training module DT monitors the execution of the maneuver through data transmitted therefrom from the components of the feedback system.

At reference numeral 208, the driver/user executes a maneuver. Prior to, during, and/or upon completion of the maneuver, the driver training module DT receives data from one or more of the vehicle sensor(s) 36, the gaze detection unit 56, the exterior camera(s) 58 and/or the in-vehicle navigation unit 61 for the time at which the maneuver was executed.

The driver training module DT then analyzes the data to evaluate/assess the maneuver (reference numeral 210). Data from a single vehicle component may be used to evaluate the maneuver, or a combination of data from various vehicle components may be used to evaluate the maneuver. The data can indicate whether the vehicle 12 is in a proper lane before, during, and/or after the maneuver, whether the turn signal was used, whether the vehicle speed is appropriate before, during, and/or after a maneuver, and/or overall, whether the maneuver is suitably performed. In the following example, the driver is making a left turn. Data from the vehicle vision system (e.g., a forward facing camera) and in-vehicle navigation unit 61 (e.g., global positioning system, GPS) enable the driver training module DT to determine if the vehicle 12 is in the left most lane. Feedback from the steering wheel (e.g., steering angle), turn signal indicator, accelerometer, and yaw enable the driver training module DT to evaluate if the vehicle 12 turning too fast or too slow, or if the vehicle 12 is turning smoothly. After the turn is complete, the driver training module DT can use data from the vision system and in-vehicle navigation unit 61 to also determine if the vehicle 12 has turn into the correct lane (left most lane).

If the analysis indicates that the maneuver was performed correctly, the program 16 is configured to retrieve, and then display or play positive feedback for the user (reference numeral 212). If, however, the analysis indicates that the maneuver was not performed correctly, the driver training module DT is configured to retrieve, and then display or play feedback indicating how the maneuver could be improved (reference numeral 220). The feedback may be in the form of prerecorded audible messages or video messages. These messages may be stored in the memory 50 or accessed by the program 16 from an offboard server (not shown). These messages may also be linked to a particular type of maneuver, and, in some instances, to a particular type of maneuver improvement. For example, if the analysis indicates that the vehicle 12 stayed in the proper lane through a roundabout, an audible message may be played saying, e.g., "great work through the roundabout." For another example, if the analysis indicates that the vehicle 12 entered another lane while going through a roundabout, the program 16 can retrieve an audible messaging instructing the user to work on staying in his/her lane during roundabout driving or a video message illustrating proper roundabout driving behavior. Both of these types of messages may be linked to the maneuver in the memory 50 or offboard server. It is to be understood that if the real-time feedback is a video message, the display 54 may inform the user that a message is waiting for him/her to retrieve once the vehicle 12 is turned off.

The driver training module DT continuously monitors for subsequent driving maneuvers as the vehicle 12 is moving (as shown at reference numeral 214). If another maneuver is performed (reference numeral 208), the driver training module DT will receive data, perform the analysis (reference 210), and provide any appropriate audio and/or visual feedback (212 or 220). If no additional maneuvers are performed and the vehicle 12 arrives at the destination or is turned off, the training module DT will end the training mode session, as shown at reference numeral 216.

In an example, after the training route is complete or the training mode session is ended, the driver training module DT may prompt the user to i) save any maneuvers needing improvement in the memory 50, or ii) transmit the maneuvers needing improvement to the service center 30 for storage in the user's personal profile.

The driver aid mode is an enhancement of the driver training mode. In addition to the steps and features previously described for the driver training mode, the driver aid mode is also configured to assist drivers in recognizing driving related objects. The driver aid module DA and mode will be described in reference to FIGS. 1 and 4. Reference numeral 400 in FIG. 4 generally identifies steps that are executed during the operation of the driver aid mode. The box labeled DA indicates that the user has input his/her selection to initiate the driver aid module DA and mode, and the program 16 recognizes this selection. It is to be understood that any of the instructions of the driver aid module DA and/or features of the driver aid mode that are similar to the driver training module DT and mode may not be discussed in the same level of detail, as these details are provided herein in reference to FIGS. 2 and 3.

In response to the user selection of the driver aid mode, the driver aid module DA initiates the feedback system (e.g., vehicle sensor(s) 36, gaze detection unit 56, exterior camera(s) 58, display 54, and audio component 60). Feedback system initiation is shown at reference numeral 402 of FIG. 4.

The driver aid module DA then enables the user to enter his/her destination via the display 54, as depicted at reference numeral 404. Similar to the driver training module DT, when the user enters his/her destination, the driver aid module DA is configured to prompt the user for information about maneuver(s) to include in the route as well as maneuver(s) to avoid. Upon receiving this additional information, the driver aid module DA accesses the in-vehicle navigation unit in order to generate initial step(s) of a driver aid route to the input destination (reference numeral 406).

Also similar to the driver training module DT, the driver aid module DA includes instructions to dynamically adjust, in conjunction with the in-vehicle navigation unit 61, the driver aid route as the user travels to the destination. Dynamic adjustment may be performed in order to include particular user-selected maneuvers in, or to eliminate particular user-selected maneuvers from the driver aid route.

In response to the user entering the destination and as represented by reference numeral 406, the driver aid module DA also enables the heads-up display and generates the ideal and then-current driving lines 64, 66 (see FIG. 3) for display on the heads-up display 54 as previously described. The lines 64, 66 are examples of the real-time visual feedback that is available to the user during the driver aid mode.

Also in response to the user entering the destination (and represented by reference numeral 406), the driver aid module DA determines whether any reminder alerts are associated with the generated step(s) of the driver aid route. Reminder alerts are audio or visual notifications that alert the driver to particular objects outside of the vehicle 12 that may impact the driving event. These objects include stop lights, yield signs, stop signs, or speed limit signs. The notifications serve as an alert for the driver that he/she may have to stop or yield, or that he/she could check the then-current speed limit.

The position of these objects may be stored in the in-vehicle navigation unit 61 (e.g., with street information, etc.). As such, when the driver aid route is generated, the driver aid module DA is programmed to identify the object(s), and their location(s), that will be encountered along the driver aid route. Upon identifying the object(s), the driver aid module DA is also programmed to retrieve the reminder notification associated with the identified object(s). Since the driver aid route can be dynamically altered as the vehicle 12 moves, the driver aid module DA can dynamically identify the object(s) and retrieve the associated reminder notification(s).

In another example, when the user is prompted for the route destination (at reference numeral 404), the user may choose not to input the destination. In these instances, the driver aid module DA is configured to bypass prompting the user for information about maneuver(s) to include in the route as well as maneuver(s) to avoid, as well as to bypass generating the initial step(s) of the training route and determining whether any reminder alerts are associated with the generated step(s). These bypass steps are shown at reference numeral 408 in FIG. 4.

Whether the destination is entered or not, as the vehicle 12 begins to travel, the driver aid module DA monitors for the object(s) outside of the vehicle 12. Monitoring for the object(s) outside of the vehicle 12 may be accomplished through data that is received from the exterior camera(s) 58. Reference numeral 410 indicates that the vehicle 12 is approaching one of the objects and that the driver aid module DA recognizes the object as a trigger for the reminder alert/notification.

The driver aid module DA then determines whether the object that triggered the reminder alert/notification is associated with a pre-retrieved reminder alert/notification (reference numeral 412). If so, the previously retrieved reminder alert/notification is played or displayed for the user (reference numeral 414). If not, the driver aid module DA dynamically identifies the object and retrieves (e.g., from the memory 50) the reminder notification associated with the identified object(s) for play or display (reference numeral 416). Audio alerts/notifications may be played through the audio component 60 and visual alerts/notifications may be displayed via the display 54. As examples, the reminder notification may be an audio message identifying the object, e.g., "stop sign approaching," or an audible tone, beep, etc., or a video message displaying a picture of the object that the vehicle 12 is approaching using the display 54.

The driver aid module DA continuously monitors for subsequent object(s) as the vehicle 12 is moving (as shown at reference numeral 418). If the vehicle approaches another object (reference numeral 410), the driver aid module DA will receive exterior camera data, determine whether the associated reminder alert/notification is pre-retrieved or loaded (reference 4120), and ultimately will provide any appropriate audio and/or visual reminder alert/notification (414 or 416). If no additional objects are approached and then the vehicle 12 arrives at the destination or is turned off, the driver aid module DA will end the session, as shown at reference numeral 420.

Figure 4:
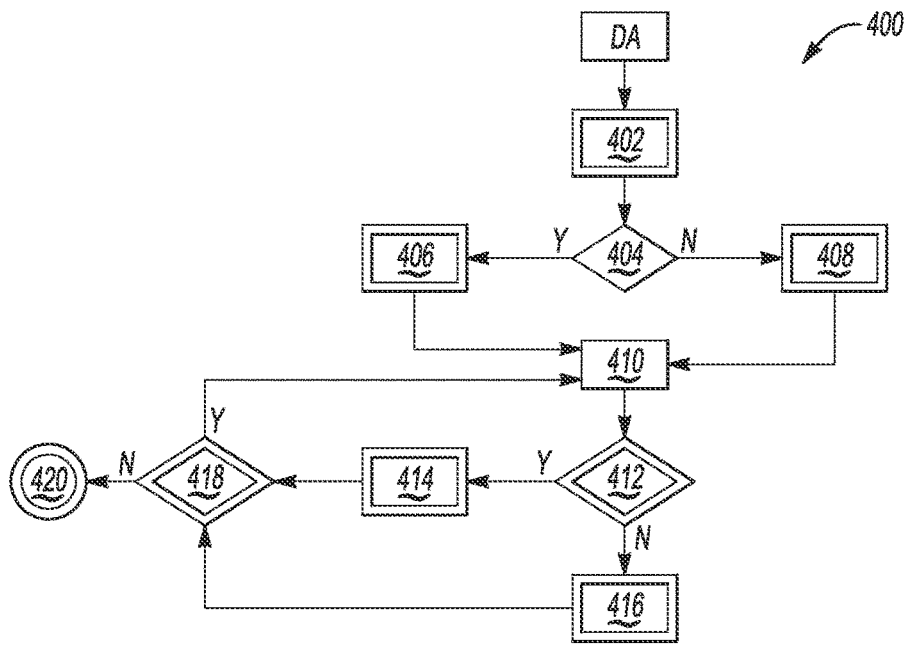
FIG. 4 is a flow diagram illustrating steps executed during operation of a driver aid mode of the driving aid computer program.

While not shown in FIG. 4, it is to be understood that the driving aid module DA may also be programmed to monitor driving maneuvers, analyze/assess driving maneuvers, and provide the user with real-time feedback of the assessed driving maneuvers in the same manner as previously described for the driver training module DT. In an example, after the driver aid route is complete or the session of the driver aid mode is ended, the program 16 may prompt the user to i) save any maneuvers needing improvement in the memory 50, or ii) transmit the maneuvers needing improvement to the service center 30 for storage in the user's personal profile.

The practice mode of the program 16 allows the driver to practice particular maneuver(s) that he/she specifically selects. The practice module PM and mode will be described in reference to FIGS. 1 and 5. Reference numeral 500 in FIG. 5 generally identifies steps that are executed during the operation of the practice mode. The box labeled PM indicates that the user has input his/her selection to initiate the practice module PM and mode, and the program 16 recognizes this selection.

In response to the user selection of the practice mode, the practice module PM is configured to display learning preferences on the screen of the display 54 for the user's selection (reference numeral 502). Learning preferences may be any driving maneuver, such as roundabouts, one-way streets, turnarounds, left turns, on-ramps to expressways, etc. The user can select one or more learning preferences that he/she would like included in a practice route (reference numeral 504).

The practice module PM then enables the user to enter his/her destination via the display 54, as depicted at reference numeral 506. Upon receiving the learning preference information and the destination information, the practice module PM accesses the in-vehicle navigation unit 61 in order to generate a practice route to the input destination which includes the greatest number of the selected learning preferences (reference numeral 508).

If several routes are generated, the practice module PM will display them for the user to select one practice route to execute. If a single route is generated, the practice module PM will inform the user that the practice route is ready to be executed. The user-selected or single practice route is then initiated (reference numeral 510) until the vehicle 12 reaches the destination (reference numeral 512).

While not shown in FIG. 5, it is to be understood that the practice module PM may also be programmed to monitor driving maneuvers, analyze/assess driving maneuvers, and provide the user with real-time feedback of the assessed driving maneuvers in the same manner as previously described for the driver training module DT. In an example, after the practice route is complete or the session of the practice mode is ended, the program 16 may prompt the user to i) save any maneuvers needing improvement in the memory 50, or ii) transmit the maneuvers needing improvement to the service center 30 for storage in the user's personal profile.

The test mode of the program 16 allows the driver to disable the visual and audio components of the feedback system so that he/she can traverse a test route without real-time post maneuver feedback. In the test mode, the components of the feedback system will assess driving maneuver(s) in the background, but not real-time feedback will be provided. The test module TM includes instructions for generating a driving report that will provide the user with post-route feedback. The test module PM and mode will be described in reference to FIGS. 1 and 6. Reference numeral 600 in FIG. 6 generally identifies steps that are executed during the operation of the test mode. The box labeled TM indicates that the user has input his/her selection to initiate the test module TM and mode, and the program 16 recognizes this selection.

In response to the user selection of the test mode, the test module DT disables the audio and visual feedback features, represented by reference numeral 602. Even though the audio and visual feedback features are temporarily disabled, the vehicle sensor(s) 36, gaze detection unit 56, and exterior camera(s) 58 of the feedback system are running in the background. As such, visual feedback (e.g., driving lines 64, 66) and audio feedback are not provided to the user in real-time during the test mode, but data collection and maneuver analysis is still performed.

The test module TM then enables the user to enter his/her destination via the display 54, as depicted at reference numeral 604. Upon receiving this information, the test module TM accesses the in-vehicle navigation unit 61 in order to generate a test route to the input destination (reference numeral 606). If several test routes are generated, the test module TM will display them for the user to select one test route to execute. If a single test route is generated, the test module TM will inform the user that the test route is ready to be executed. The user-selected or single test route is then initiated until the vehicle 12 reaches the destination.

While the vehicle 12 travels the test route, the feedback system components assess/analyze the driver performance in the background until the destination is reached (reference numeral 608). To analyze the driver performance, the test module TM monitors for the execution of a driving maneuver. The driving maneuvers to be monitored may be default settings, or may be pre-programmed by the user. Example maneuvers include those previously mentioned, such as turns, roundabouts, turnarounds, etc., as well as any other driving maneuver (e.g., reversing, changing lanes, etc.). The test module TM monitors the execution of the maneuver through data transmitted therefrom from the components of the feedback system. Upon receiving the data, the test module TM then analyzes the data to evaluate/assess the maneuver. It is to be understood that the test module TM continuously monitors for driving maneuvers as the vehicle 12 is moving, and performs an analysis of any identified driving maneuvers. The analysis is stored until the vehicle 12 reaches the entered destination.

At reference numeral 610, the test route is ended, and the test module TM generates a driving report and makes the driving report available to the driver via the display 54. The driving report may be a summary of the total driving performance (i.e., including the assessment/analysis of each driving maneuver performed during the test route). The driving report may include an overall score, a map of the test route indicating where improvements may be made (e.g., locations where error(s) were made), and/or a list of positive and/or negative feedback generated for each maneuver performed along the test route. The driving report may be viewed on the in-vehicle display 54. The user may have the option to save the driving report or delete the driving report.

At reference numeral 612, the test module TM may provide the user with the option of transmitting his/her driving report or a portion thereof (e.g., the overall score) to a social media or gaming website 76 stored on a host server. The option may be displayed for the user on the display 54. Through a user input (via a touch screen, through the microphone 78, etc.), the user can initiate the transmission or decline the transmission of his/her driving report or the portion thereof to his/her account with the social media or gaming website 76. In one example, the user may input his/her account information in order to identify the social media or gaming website 76 to which the driving report information is to be transmitted. In another example, the user's account information for the social media or gaming website 76 may have previously been stored in the memory 50, and the test module TM may retrieve this information and request the input from the user, which will identify the website(s) 76 he/she would like the driver report information uploaded to.

At reference numeral 614, the user selects the option to upload the driver report information to the social media or gaming website 76. The driving report or a portion thereof will be posted, tweeted, or otherwise uploaded to the user's personal page, profile, etc. Examples of social networking websites 76 include FACEBOOK™, TWITTER®, LinkedIn®, Foursquare™, TUMBLR®, Diaspora™, Quora™, and MYSPACE®. It is to be understood that the social media or gaming website 76 may be hosted by another entity, but the networking page may be set up and maintained by the user (e.g., the vehicle driver).

Whether the user elects or declines to upload the driver report information to the social media or gaming website 76, the test module TM may also provide the user with the option of transmitting his/her driving report or a portion thereof (e.g., the overall score) to the communications and processing device 52. In an example, the communications and processing device 52 may be a smart phone, such as a GSM/LTE phone or a GSM/CDMA/LTE phone. The communications and processing device 52 may be any portable device that has cellular and/or short range wireless communication capabilities. Examples of other communications and processing devices 52 include a tablet or other computer (e.g., desktop, laptop, etc.), a wireless printer, a smart watch, a smart key fob, etc.

The option to transmit the driver report information to the communications and processing device 52 may be displayed for the user on the display 54. Through a user input (via a touch screen, through the microphone 78, etc.), the user can initiate the transmission or decline the transmission of his/her driving report or the portion thereof to the communications and processing device 52. In one example, the user may input a phone number, email address, etc. in order to identify the communications and processing device 52 to which the driving report information is to be transmitted. In another example, the phone number, email address, etc. may have previously been stored in the memory 50, and the test module TM may retrieve this information and request the input from the user, which will identify the phone number, email address, etc. he/she would like the driver report information to be transmitted to.

At reference numeral 618, the user selects the option to transmit the driver report information to the communications and processing device 52. The driving report or a portion thereof will transmitted in the form of an electronic message, such as an, email, a text and/or an SMS message, or a message that can be read by a wireless printer which can then print the driver report or portion thereof.

In any of the examples disclosed herein, transmissions from the program 16 (e.g., from the test module TM or other module to the website 76, the communications and processing device 52, etc.) may be accomplished through the communications module 42 (see FIG. 1).

After the user elects or declines to transmit the driver report information to the communications and processing device 52, the test mode is ended and the program 16 may prompt the user to i) save the driving report in the memory 50, or ii) transmit the driving report to the service center 30 for storage in the user's personal profile.

The exclusions mode of the program 16 allows the driver to exclude particular maneuver(s) that he/she specifically selects. The exclusions module EM and mode will be described in reference to FIGS. 1 and 7. Reference numeral 700 in FIG. 7 generally identifies steps that are executed during the operation of the exclusions mode. The box labeled EM indicates that the user has input his/her selection to initiate the exclusions module EM and mode, and the program 16 recognizes this selection.

In response to the user selection of the exclusions mode, the exclusions module EM is configured to display exclusion preferences on the screen of the display 54 for the user's selection (reference numeral 702). Exclusion preferences may be any driving maneuver, such as roundabouts, one-way streets, turnarounds, left turns, on-ramps to expressways, stop signs, etc. The user can select one or more exclusion preferences that he/she would not like included in an exclusion route (reference numeral 704).

The exclusions module EM then enables the user to enter his/her destination via the display 54 (reference numeral 706). Upon receiving the exclusion preference information and the destination information, the exclusions module EM accesses the in-vehicle navigation unit 61 in order to generate an exclusion route to the input destination which includes the least number of the selected exclusions preferences (reference numeral 708). In an example, the exclusion route is the fastest route including the least number of maneuvers that the user has indicated he/she does not want included in the route.

If several routes are generated, the exclusions module EM will display them for the user to select one exclusion route to execute. If a single route is generated, the exclusions module EM will inform the user that the exclusion route is ready to be executed. The user-selected or single exclusion route is then initiated (reference numeral 710) until the vehicle 12 reaches the destination (reference numeral 712).

While not shown in FIG. 7, it is to be understood that the exclusions module EM may also be programmed to monitor driving maneuvers, analyze/assess driving maneuvers, and provide the user with real-time feedback of the assessed driving maneuvers in the same manner as previously described for the driver training module DT. In an example, after the exclusions route is complete or the session of the exclusion mode is ended, the program 16 may prompt the user to i) save any maneuvers needing improvement in the memory 50, or ii) transmit the maneuvers needing improvement to the service center 30 for storage in the user's personal profile.

As mentioned above in reference to FIG. 6, the test module TM includes computer readable instructions for generating the driving report based upon the analysis/assessment of maneuvers performed during the test route. Each of the other modules DT, DA, PM, and EM may also analyze/assess one or more driving maneuvers while the vehicle 12 traverses the associated route. It is to be understood that each of the other modules DT, DA, PM, and EM may also include computer readable instructions for generating a driving report based upon the analysis/assessment of maneuvers performed during the associated route (e.g., training route, driver aid route, practice route, exclusions route). In these examples, the driving report may include a list of the maneuvers performed, feedback provided, a driving score, a map identifying location(s) where driving improvements may be made, etc.

In addition to the modules DT, DA, PM, TM, and EM, the program 16 may also include a route suggestion module RM. The route suggestion module RM may be used in combination with any of the other modules DT, DA, PM, TM, and EM. The route suggestion module RM includes computer readable instructions for receiving a destination and for retrieving a list of historical driver errors made along a fastest route to the destination. The historical driver errors may include driving maneuvers that were assessed/analyzed when the vehicle 12 previously traversed the same or a similar route. The driving maneuvers included in the list of historical driver errors had been associated with negative or improvement feedback.

The list of historical driver errors may include every error along the route since the program 16 had been installed, or for some other predetermined amount of time (e.g., 6 months, 1 year, etc.). The list of historical driver errors may be dynamically updated every time the user travels the route and uses any of the modes and modules DT, DA, PM, TM, and EM disclosed herein.

The list of historical driver errors may be displayed for the user on the display 54. The user may then input a selection indicating that he/she wishes to ignore certain driving errors, practice certain driving errors, and/or exclude certain driving errors. If the user ignores certain driving errors, the route suggestion module RM (or another module DT, DA, PM, TM, and EM utilizing the route suggestion module RM) will generate the route and display it for the user (or otherwise announce route steps). If the user chooses to practice certain driving errors, the route suggestion module RM (or another module DT, DA, PM, TM, and EM utilizing the route suggestion module RM) will generate the fastest route to the destination that includes the most number of maneuvers associated with the driving errors so that the user can practice the maneuvers. If the user chooses to exclude certain driving errors, the route suggestion module RM (or another module DT, DA, PM, TM, and EM utilizing the route suggestion module RM) will generate the fastest route to the destination that excludes the maneuvers associated with the driving errors so that the user can avoid the maneuvers.

Each of the modules DT, DA, PM, TM, and EM may also include computer readable instructions for receiving shoulder check feedback from the gaze detection unit 56 and for generating a blind spot reminder based upon the shoulder check feedback. While these instructions may be part of the respective modules DT, DA, PM, TM, and EM of the program 16, they may alternatively be part of the blind spot driving aid computer program 18. As such, the blind spot driving aid computer program 18 will now be discussed in reference to FIG. 8.

Once the blind spot driving aid computer program 18 is opened, the user interface of the program 18 enables the user to turn the blind spot driving aid on or off during a driving event.

The blind spot driving aid computer program 18 includes computer readable instructions for monitoring a driver's gaze (i.e., eye positioning) during the driving event. In this example, the driver's gaze is monitored continuously throughout the driving event. Information about the driver's gaze may be stored temporarily in the memory 50 for subsequent use by the blind spot driving aid computer program 18. Any temporarily stored gaze data may be overwritten with newly obtained gaze data. The gaze/eye positioning of the vehicle driver may be obtained using the gaze detection unit 56 and any of the techniques previously described herein.

The blind spot driving aid computer program 18 also includes computer readable instructions for predicting a lane change event during the driving event. In one example, predicting the lane change event may be accomplished by monitoring the vehicle bus 38 for signal light messages. The signal light messages indicate that the left or right vehicle blinker has been activated (the left blinker light is shown as being activated in FIG. 8). This example may also utilize exterior camera 58 data, which can identify whether a right or left turn opportunity is within the vicinity of the vehicle 12 when the signal light message is detected. If there is no turn opportunity within the vicinity of the vehicle 12, the probability that the signal light is indicative of a lane change may be higher than if there is a turn opportunity within the vicinity of the vehicle 12. In another example, predicting the lane change event may be accomplished using exterior camera 58 data. Images from the forward facing cameras may be used to detect the lanes and to detect the lane change. In still another example, predicting the lane change event may be accomplished by monitoring the steering wheel angle to detect if the driver is trying to change lanes. Any of these techniques may be used alone or in combinations with each other to predict the lane change event.

When the lane change event is predicted, the program 18 receives shoulder check feedback from the gaze detection unit 56. To receive shoulder check feedback, the program 18 may retrieve (from a temporary cache in the memory 50) the most recent gaze/eye positioning data stored by the gaze detection unit 56. The program 18 utilizes this data to determine if the driver has checked his/her blind spot. As discussed above and as shown in FIG. 8, the gaze detection unit 56 is an eye-tracking device that is configured to monitor an eye position of the vehicle driver while the vehicle 12 is in operation. As shown in FIG. 8, the gaze detection unit 56 may include the facial imaging camera 72 positioned on the rear-view mirror 74. In one example, the most recent gaze/eye positioning data may indicate that the driver's eyes shifted left or right and then were not detectable for an average time period for performing a shoulder check (a value that is predetermined and stored in the memory 50). In this example, the program 18 deduces that the driver has performed a shoulder check and no blind spot reminder is alerted. Alternatively, the data may indicate that the driver's eyes have not shifted from the front windshield. In these instances, the program 18 may deduce that the driver has not performed a shoulder check, and that the blind spot reminder should be alerted. In still another example, the camera 72 images may show that the driver did or did not check his/her blind sport before turning on the blinker and/or initiating a lane change.

When the program 18 determines that the user has not performed a shoulder check (i.e., check his/her blind spot), the program 18 will generate a check blind spot reminder 80. The check blind spot reminder 80 shown in FIG. 8 is a visual reminder, illuminated on the display 54, to check the blind spot. The visual reminder may be made up of text, image(s), or combinations thereof. The visual reminder may be used alone or in combination with an audio message that reminds the user to check his/her blind spot or to perform a shoulder check. Alternatively, the audio message may be used alone. The audio message is a prerecorded message that is retrieved by the program 18 and played through the audio component 60.

Referring back to FIG. 1, in some instances, the user may select to have information transmitted to the service center 30 for storage in the user's personal profile. The service center 30 is a center that provides back end VCP services to the vehicle 12. The center 30 is capable of communicating with the VCP 14 when the vehicle 12 is within the coverage area of the carrier/communication system 20.

The service center 30 may include server(s) 82 that is/are configured to receive information from the VCP 14 in the form of a computer-readable message (an example of which includes packet data). In this example, a communications module 84 receives the computer-readable message, and upon receiving and reviewing the data in the message, the communications module 84 transmits the data to the server 82. In one example, the server 82 may identify the vehicle 12 sending the message and the profile of the user associated with the vehicle 12.

The communications module 84 includes switch(es). The switch may be a private branch exchange (PBX) switch. The switch routes incoming signals so that voice transmissions are usually sent to either a live advisor 86 or the automated response system 86', and data transmissions are passed on to a modem or other piece of equipment (e.g., server 82) for demodulation and further signal processing. The modem preferably includes an encoder, as previously explained, and can be connected to various devices such as server 82 and database(s) 88.

The service center 30 may also include a processor 90, which is often used in conjunction with telecommunication and computer equipment 92, is generally equipped with suitable software and/or programs enabling the processor 90 to accomplish a variety of functions. Further, the various operations of the center 30 may be carried out by one or more computers (e.g., computer equipment 92) programmed to carry out such operations. The telecommunication and computer equipment 92 (including computers) may include a network of servers (including server 82) coupled to both locally stored and remote databases (e.g., database 88) of any information processed.

The center 30 also includes live and/or automated advisors 86, 86'. Each advisor 86, 86' may be associated with a workstation, including telecommunication and computer equipment 92.

The database(s) 88 at the center 30 may be designed to store data from the program(s) 16 and/or 18, vehicle record(s), subscriber/user profile records, or any other pertinent subscriber and/or vehicle information. It is to be understood that the databases 88 may allow the center 30 to function as a repository for data collected from the vehicle 12 and/or from the vehicle owner/driver. In some instances, another facility may function as a repository for collected data (e.g., a customer relationship management system (not shown) associated with the center 30 whose database(s) the server 82 or advisors 86, 86' can access).

As illustrated in FIG. 1, the various center 30 components are coupled to one another via a network connection or bus 94, such as one similar to the vehicle bus 38 previously described.

It is to be appreciated that the center 30 may be any central or remote facility, manned or unmanned, mobile or fixed, to or from which it is desirable to exchange voice and data communications. As such, the live advisor 86 may be physically present at the center 30 or may be located remote from the service center 30 while communicating therethrough.

The center 30 shown in FIG. 1 may also be virtualized and configured in a Cloud Computer, that is, in an Internet-based computing environment. For example, the computer equipment 92 may be accessed as a Cloud platform service, or PaaS (Platform as a Service), utilizing Cloud infrastructure rather than hosting computer equipment 92 at the service center building. The database 88 and server 82 may also be virtualized as a Cloud resource. The Cloud infrastructure, known as IaaS (Infrastructure as a Service), typically utilizes a platform virtualization environment as a service, which may include components such as the processor 90, database 88, server 82 and computer equipment 92.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A driving aid for an automotive vehicle, comprising:
a driving aid computer program embedded on a non-transitory, tangible computer readable medium, the program including:
a training module including computer readable instructions for providing audio and visual feedback to a driver as a training route is executed, dynamically adjusting the training route to enable the driver to practice a first maneuver and avoid a second distinct maneuver, receiving shoulder check feedback from a gaze detection unit, the shoulder check feedback representing that at least one or more eyes of a driver have not been detected by the gaze detection unit for a predetermined time period, and generating a check blind spot reminder based upon the received shoulder check feedback;
a driver aid module including computer readable instructions for providing audio and visual feedback to the driver as a driver aid route is executed, dynamically adjusting the driver aid route to enable the driver to practice the first maneuver and avoid the second distinct maneuver, monitoring a position of an object external to a vehicle, and providing a notification pertaining to the object external to the vehicle to the driver when the object external to the vehicle approaches the vehicle as the driver aid route is executed;
a practice module including computer readable instructions for receiving an input related to a learning preference and generating a practice route that includes the learning preference; and
a test module including computer readable instructions for i) disabling audio and visual feedback systems, ii) assessing a driving maneuver during a test route, and iii) upon completion of the test route, providing the driver with a driving report based upon the assessment of the driving maneuver;
an audio system of the automotive vehicle for providing the audio feedback; and
an electronic display of the automotive vehicle for providing the visual feedback.

2. The driving aid as defined in claim 1 wherein each of the training module and the driver aid module further includes computer readable instructions for generating and displaying a first driving line and a second distinct driving line on the electronic display, wherein the electronic display is an augmented reality heads-up display.

3. The driving aid as defined in claim 2 wherein each of the training module and the driver aid module further includes computer readable instructions for receiving input from any of the gaze detection unit, a vehicle sensor, an exterior camera, or combinations thereof.

4. The driving aid as defined in claim 1, wherein the program further comprises an exclusions module including computer readable instructions for receiving an input related to an exclusion preference and generating an exclusion route that includes a least number of the exclusion preference.

5. The driving aid as defined in claim 4 wherein:
the practice module includes computer readable instructions for providing audio and visual feedback to the driver as the practice route is executed; and
the exclusions module includes computer readable instructions for providing audio and visual feedback to the driver as the exclusion route is executed.

6. The driving aid as defined in claim 1 wherein the program further comprises a route suggestions module including computer readable instructions for receiving a destination input identifying a destination, displaying a list of historical driver errors made along a fastest route to the destination, receiving driver feedback indicating the historical driver errors to ignore, practice, or exclude, from a driving route, and generating the driver route based upon the driver feedback.

7. The driving aid as defined in claim 1 wherein each of the training module and the driver aid module, the practice module, or combinations thereof further includes computer readable instructions for assessing a driving maneuver during the training route and the driver aid route, the practice route, or combinations thereof, respectively, and for generating a driving report based upon the assessment.

8. The driving aid as defined in claim 7, further comprising a communications module for transmitting the driving report to a communications and processing device selected from a tablet computer, a smartphone, and a desktop computer, for transmitting at least a portion of the driving report to a social media website, or combinations thereof.

9. The driving aid as defined in claim 1, further comprising a communications module for transmitting the driving report to a communications and processing device selected from a tablet computer, a smartphone, and a desktop computer, for transmitting at least a portion of the driving report to a social media website, or combinations thereof.

10. The driving aid as defined in claim 1 wherein the driving report includes a driving score and a map of the test route identifying where an error was made along the test route.

11. A system for an automotive vehicle, comprising:
a microprocessor;
a memory associated with the microprocessor;
an in-vehicle system in communication with the microprocessor, the in-vehicle system including at least a user input device, a gaze detection unit, a vehicle sensor, and an exterior camera; and
a driving aid application resident on the memory, the driving aid application including:
  a training module including computer readable instructions for providing audio and visual feedback to a driver as a training route is executed, and dynamically adjusting the training route to enable the driver to practice a first maneuver and avoid a second distinct maneuver;
  a driver aid module including computer readable instructions for providing audio and visual feedback to the driver as a driver aid route is executed, dynamically adjusting the driver aid route to enable the driver to practice the first maneuver and avoid the second distinct maneuver, monitoring a position of an object external to a vehicle via the exterior camera, determine that the object is a trigger for providing a notification pertaining to the object external to the vehicle to the driver, and providing a the notification to the driver when the object external to the vehicle approaches the vehicle as the driver aid route is executed;
  a practice module including computer readable instructions for receiving an input related to a learning preference and generating a practice route that includes the learning preference;
  an exclusions module including computer readable instructions for receiving an input related to an exclusion preference and generating an exclusion route that includes a least number of the exclusion preference; and
  a test module including computer readable instructions for i) disabling audio and visual feedback systems, ii) assessing a driving maneuver during a test route, and iii) upon completion of the test route, providing the driver with a driving report based upon the assessment of the driving maneuver.

12. The system as defined in claim 11 wherein:
the practice module includes computer readable instructions for providing audio and visual feedback to the driver as the practice route is executed; and
the exclusions module includes computer readable instructions for providing audio and visual feedback to the driver as the exclusion route is executed.

13. The system as defined in claim 11 wherein the driving aid application further includes a route suggestions module including computer readable instructions for receiving a destination input identifying a destination, displaying a list of historical driver errors made along a fastest route to the destination, receiving driver feedback indicating the historical driver errors to ignore, practice, or exclude, from driving route, and generating the driver route based upon the driver feedback.

14. The system as defined in claim 11 wherein the training module further includes computer readable instructions for receiving shoulder check feedback from the gaze detection unit, the shoulder check feedback representing that at least one or more eyes of a driver have not been detected by the gaze detection unit for a predetermined time period, and generating a check blind spot reminder based upon the received shoulder check feedback.

15. The system as defined in claim 11 wherein the training module further includes computer readable instructions for assessing a driving maneuver during the training route, and for generating a driving report based upon the assessment.

16. The system as defined in claim 15, further comprising:
a communications and processing device selected from a tablet computer, a smartphone, and a desktop computer; and
a social media website;
and wherein the driving aid application further includes a communications module for transmitting the driving report to the communications and processing device, the social media website, or combinations thereof.

17. The system as defined in claim 11 further comprising:
a communications and processing device selected from a tablet computer, a smartphone, and a desktop computer; and
a social media website;
wherein the driving aid application further includes a communications module for transmitting the driving report to the communications and processing device, the social media website, or combinations thereof.

18. The system as defined in claim 11, further comprising:
an audio system of the automotive vehicle for providing the audio feedback; and
an electronic display of the automotive vehicle for providing the visual feedback.

* * * * *